US012627008B2

(12) United States Patent
Kim

(10) Patent No.: US 12,627,008 B2
(45) Date of Patent: May 12, 2026

(54) BATTERY FOR TESTING SHORT CIRCUIT, MANUFACTURING METHOD THEREFOR, AND BATTERY SAFETY ANALYSIS METHOD

(71) Applicant: LG ENERGY SOLUTION, LTD., Seoul (KR)

(72) Inventor: Yongtae Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 255 days.

(21) Appl. No.: 18/287,620

(22) PCT Filed: Sep. 26, 2022

(86) PCT No.: PCT/KR2022/014318
§ 371 (c)(1),
(2) Date: Oct. 19, 2023

(87) PCT Pub. No.: WO2023/096130
PCT Pub. Date: Jun. 1, 2023

(65) Prior Publication Data
US 2024/0204374 A1 Jun. 20, 2024

(30) Foreign Application Priority Data

Nov. 25, 2021 (KR) ........................ 10-2021-0163887

(51) Int. Cl.
*H01M 50/569* (2021.01)
*H01M 50/449* (2021.01)

(52) U.S. Cl.
CPC ....... *H01M 50/569* (2021.01); *H01M 50/449* (2021.01)

(58) Field of Classification Search
CPC .. H01M 50/569; H01M 50/449; H01M 10/48; H01M 50/489; H01M 10/4285; H01M 50/463; G01R 31/52; Y02E 60/10; Y02P 70/50
See application file for complete search history.

(56) References Cited

U.S. PATENT DOCUMENTS

| | | | | |
|---|---|---|---|---|
| 6,632,561 B1 * | 10/2003 | Bauer | .................. | H01M 4/621 |
| | | | | 429/129 |
| 8,081,000 B2 * | 12/2011 | Kasamatsu | .......... | H01M 10/44 |
| | | | | 324/426 |
| 9,588,183 B2 | 3/2017 | Nakayama et al. | | |
| 2008/0143337 A1 | 6/2008 | Fujikawa et al. | | |
| 2009/0250259 A1 | 10/2009 | Mok et al. | | |
| 2014/0030588 A1 | 1/2014 | Hong et al. | | |
| 2015/0212162 A1 | 7/2015 | Nakayama et al. | | |

(Continued)

FOREIGN PATENT DOCUMENTS

| | | |
|---|---|---|
| EP | 3826097 A1 | 5/2021 |
| JP | 5930342 B2 | 6/2016 |

(Continued)

*Primary Examiner* — Feba Pothen
(74) *Attorney, Agent, or Firm* — Bryan Cave Leighton Paisner LLP

(57) ABSTRACT

The present disclosure relates to a battery for testing a short circuit, a manufacturing method therefor, and a battery safety analysis method, which manufacture a battery for testing a short circuit, capable of easily switching to an internal short circuit state, and which analyze battery safety by using the battery.

7 Claims, 3 Drawing Sheets

(56)                    References Cited

U.S. PATENT DOCUMENTS

| | | |
|---|---|---|
| 2020/0168885 A1 | 5/2020 | Lee et al. |
| 2020/0243897 A1 | 7/2020 | Senoue |
| 2022/0045373 A1 | 2/2022 | Yoon et al. |
| 2022/0140401 A1 | 5/2022 | Kim et al. |

FOREIGN PATENT DOCUMENTS

| | | | | | |
|---|---|---|---|---|---|
| JP | WO2014/016956 A1 | | 7/2016 | | |
| JP | 2017-182976 A | | 10/2017 | | |
| JP | WO2018/181704 A1 | | 2/2020 | | |
| JP | 2020-123484 A | | 8/2020 | | |
| KR | 10-2013-0030807 A | | 3/2013 | | |
| KR | 10-2013-0135172 A | | 12/2013 | | |
| KR | 20180135700 A | * | 12/2018 | .......... | H01M 2/0275 |
| KR | 10-2019-0001429 A | | 1/2019 | | |
| KR | 20190001429 A | * | 1/2019 | ............ | B23K 26/22 |
| KR | 10-2020-0053782 A | | 5/2020 | | |
| KR | 10-2020-0118958 A | | 10/2020 | | |
| KR | 10-2021-0017178 A | | 2/2021 | | |

* cited by examiner

Step of preparing electrode — S1

Step of eliminating positive electrode active material — S2

Step of laminating perforated separator — S3

Step of laminating auxiliary separator — S4

Step of laminating negative electrode portion — S5

Step of completing battery — S6

Step of charging battery — S10

Short circuiting step — S20

Step of safety analyzing — S30

BATTERY FOR TESTING SHORT CIRCUIT, MANUFACTURING METHOD THEREFOR, AND BATTERY SAFETY ANALYSIS METHOD

CROSS-REFERENCE TO RELATED APPLICATION

The present application is a National Phase entry pursuant to 35 U.S.C. § 371 of International Application No. PCT/KR2022/014318, filed on Sep. 26, 2022, and claims the benefit of and the priority to Korean Patent Application No. 10-2021-0163887, filed on Nov. 25, 2021, the entire contents of which is are hereby incorporated by reference in its their entirety.

TECHNICAL FIELD

The present disclosure relates to a battery for short circuit inspection, a manufacturing method thereof, and a battery safety analysis method, and to a battery for short circuit inspection that is easily switchable to an internal short circuit state, a manufacturing method thereof, and a battery safety analysis method in which battery safety is analyzed through the battery.

BACKGROUND

In general, a secondary battery, a battery that is repeatedly usable through a discharge process of converting chemical energy into electrical energy and a charging process performed in a reverse way, is highly compatible in accordance with product lines, and the secondary battery having electrical characteristics such as high energy density is universally applied to electric vehicles (EVs) or hybrid vehicles (HVs) driven by electric driving sources, in addition to portable devices.

As the secondary battery is applied to various products, safety evaluation thereof is crucial because safety of the secondary battery is related to safety of products.

There are various ways to evaluate safety of secondary batteries, one of which may be internal short circuit inspection performed under a condition in which a negative electrode and a positive electrode are in contact inside the secondary battery.

The secondary battery may be short circuited by various internal and external environments, and, in case of short circuit, there may be the risk of ignition.

Therefore, there is a need for a technology that may easily apply a short circuit state in the secondary battery to analyze safety of the secondary battery in a short circuit state.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

Summary Technical Goals

The present disclosure relates to a battery for short circuit inspection, a manufacturing method thereof, and a battery safety analysis method, and an object of the present disclosure is to provide a battery for short circuit inspection that is easily switchable to an internal short circuit state, a manufacturing method thereof, and a battery safety analysis method in which battery safety is analyzed through the battery.

Technical objects to be achieved by the present disclosure are not limited to the technical problems mentioned above, and other technical objects not mentioned will be clearly understood from the description below by those of ordinary skill in the art to which the present disclosure pertains.

Technical Solutions

A battery for short circuit inspection of the present disclosure includes: a positive electrode including a positive electrode active material on a positive electrode current collector; a negative electrode including a negative electrode active material on a negative electrode current collector; a perforated separator between the positive electrode and the negative electrode and including a perforated hole; an auxiliary separator between the positive electrode and the negative electrode and covering the perforated hole; and a battery case accommodating the positive electrode, the negative electrode, the perforated separator, and the auxiliary separator therein, wherein, the positive electrode includes an active material-eliminated area, from which the positive electrode active material is eliminated, may be formed in an area that faces the perforated hole of the perforated separator.

Advantageous Effects

A battery for short circuit inspection of the present disclosure may apply a short circuit state in a secondary battery arbitrarily in a desired situation and enable analysis of safety of the secondary battery by applying a short circuit state in the secondary battery under various conditions such as SOC, temperature, and shock.

In a battery safety analysis method of the present disclosure, it is possible to carry out safety analysis of the secondary battery by simulating a driving situation of a product to which the secondary battery is applied and applying a short circuit state.

The battery safety analysis method of the present disclosure may easily check whether the battery is safe.

DETAILED DESCRIPTION

Figure 1:
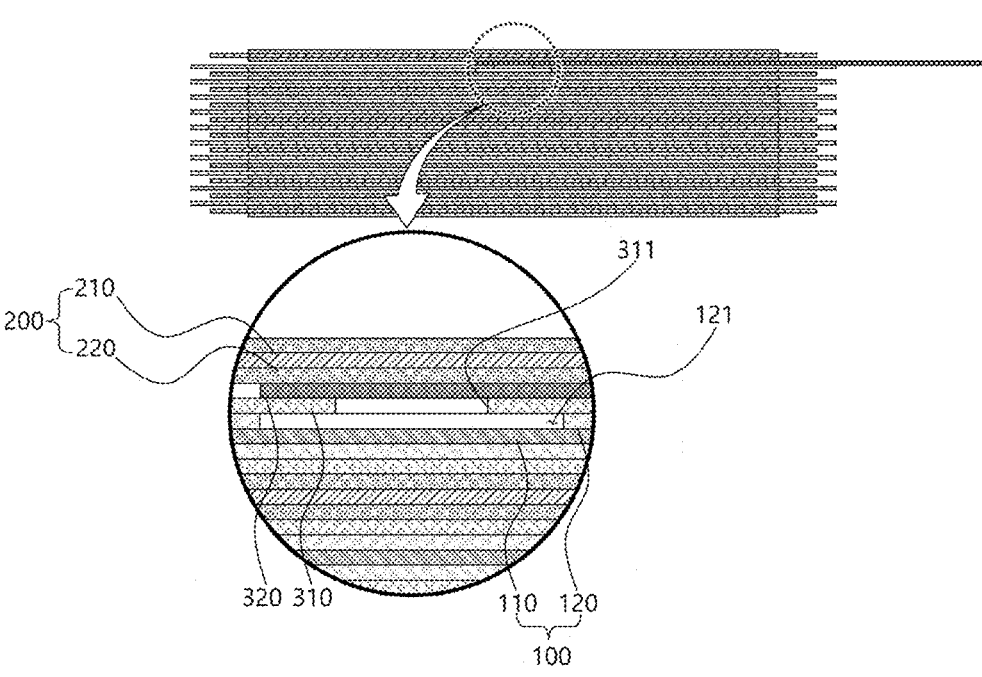
FIG. 1 is a cross-sectional view illustrating the inside of a battery for short circuit inspection of the present disclosure.

A battery for short circuit inspection of the present disclosure may include: a positive electrode portion formed by applying a positive electrode active material to a positive electrode current collector; a negative electrode portion formed by applying a negative electrode active material to a negative electrode current collector; a perforated separator laminated between the positive electrode portion and the negative electrode portion and formed with a perforated hole; an auxiliary separator laminated between the positive electrode portion and the negative electrode portion and configured to cover the perforated hole; and a battery case configured to accommodate the positive electrode portion, the negative electrode portion, the perforated separator, and the auxiliary separator therein, wherein, in the positive electrode portion, an active material-eliminated area, from which the positive electrode active material is eliminated, may be formed in an area that faces the perforated hole of the perforated separator.

In the battery for short circuit inspection of the present disclosure, an area of the active material-eliminated area may be greater than that of the perforated hole.

In the battery for short circuit inspection of the present disclosure, materials of the perforated separator and the auxiliary separator may include at least one or more of an ethylene monopolymer, propylene monopolymer, ethylene/butene copolymer, ethylene/hexene copolymer, and ethylene/methacrylate copolymer.

In the battery for short circuit inspection of the present disclosure, one end of the auxiliary separator may protrude outside the battery case.

A method of manufacturing the battery for short circuit inspection of the present disclosure may include a step of preparing an electrode by preparing the positive electrode portion in which the positive electrode active material is applied to the positive electrode current collector and the negative electrode portion in which the negative electrode active material is applied to the negative electrode current collector; a step of eliminating the positive electrode active material on a part of the positive electrode portion to form the active material-eliminated area; a step of laminating the perforated separator having the perforated hole formed in a position facing the active material-eliminated area, to the positive electrode portion; a step of laminating the auxiliary separator to the perforated separator to cover the perforated hole; a step of laminating the negative electrode portion to the positive electrode portion with the perforated separator and the auxiliary separator interposed therebetween; and a step of completing the battery for short circuit inspection by sealing after accommodating the positive electrode portion, the negative electrode portion, the perforated separator, and the auxiliary separator in the battery case.

In a step of eliminating the positive electrode active material of the method of manufacturing the battery for short circuit inspection of the present disclosure, the positive electrode active material may be eliminated by washing with N-methyl-2-pyrrolidone (NMP).

A battery safety analysis method of the present disclosure may include a step of charging the battery for short circuit inspection; a short-circuiting step by eliminating the auxiliary separator and bringing the positive electrode portion and the negative electrode portion into contact through the perforated hole; and a step of safety analyzing by measuring SOC or temperature of the battery for short circuit inspection to analyze safety.

In the step of safety analyzing of the battery safety analysis method of the present disclosure, SOC or temperature of the battery for short circuit inspection may be measured according to a time series.

Hereinafter, example embodiments according to the present disclosure will be described in detail with reference to the accompanying drawings. In this process, the size or shape of components shown in the drawings may be exaggerated for clarity and convenience of explanation. In addition, terms specifically defined in consideration of configurations and operations of the present disclosure may vary depending on the intention or custom of a user or operator. Definitions of these terms should be made based on the context throughout this specification.

In the description of the present disclosure, it should be noted that orientation or positional relationships indicated by the terms such as "center", "upper", "lower", "left", "right", "vertical", "horizontal", "inside", "outside", "one side", and "the other side" are based on orientation or positional relationships shown in the drawings or orientation or positional relationships usually of disposition when a product of the present disclosure is used, are merely for the description and brief illustration of the present disclosure, and should not be construed as limiting the present disclosure because they are not suggesting or implying that the indicated apparatus or element must be configured or operated in the specified orientation with the specified orientation.

Figure 2:
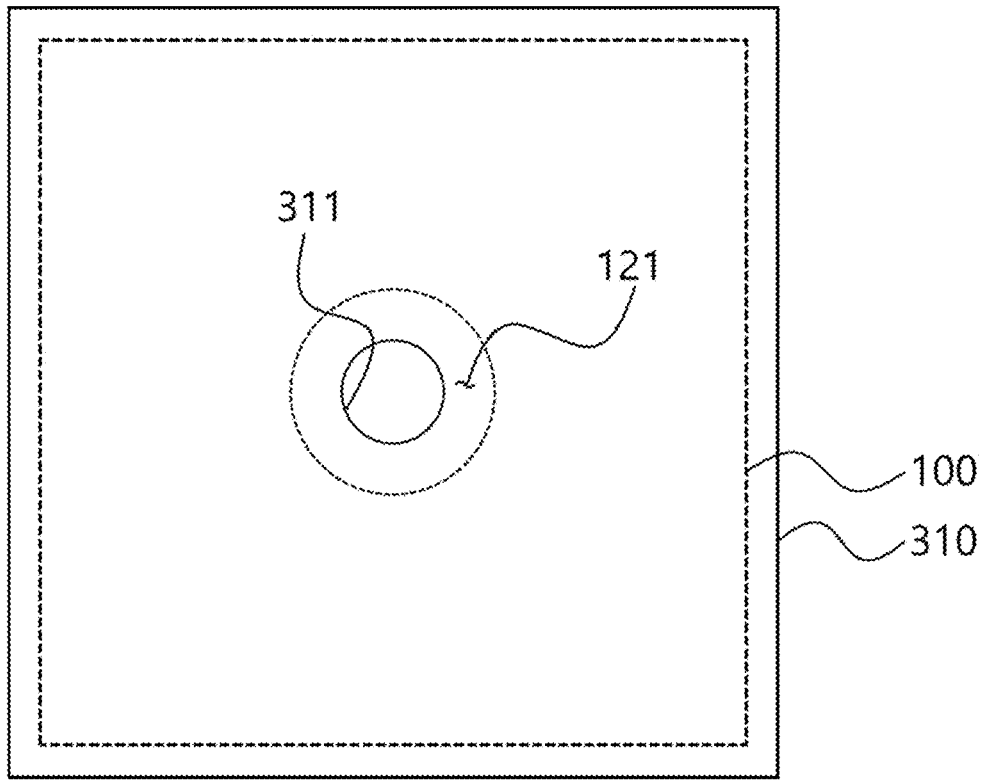
FIG. 2 is a plan view illustrating a state in which a positive electrode portion and a perforated separator are laminated.
Figure 3:
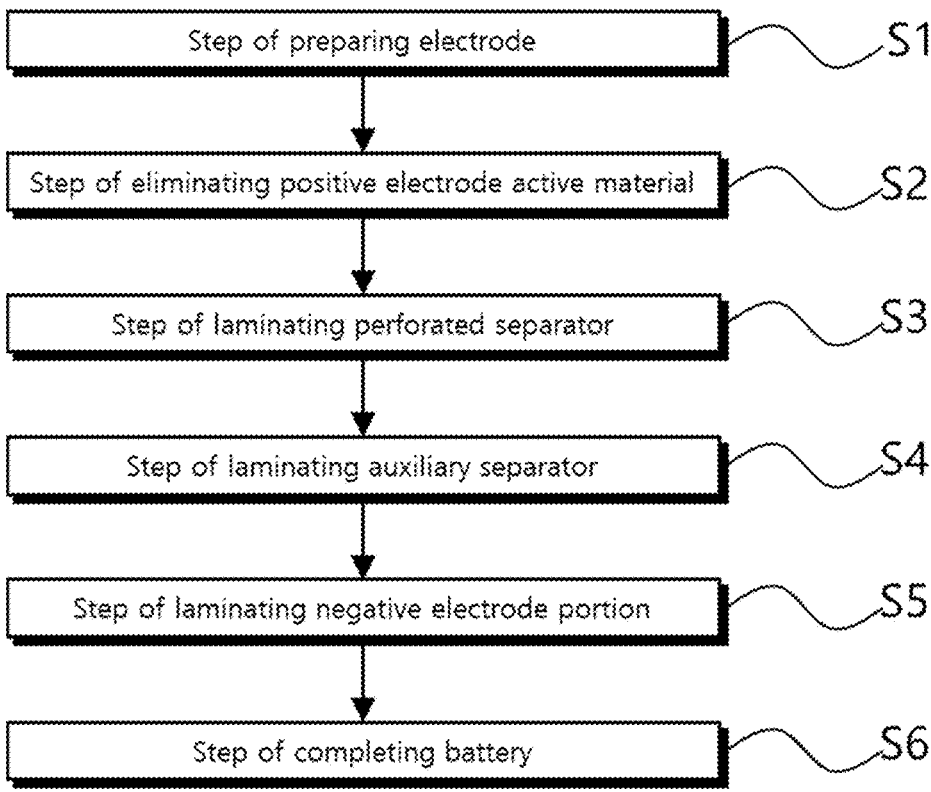
FIG. 3 is a block diagram illustrating a method of manufacturing a battery for short circuit inspection of the present disclosure.
Figure 4:
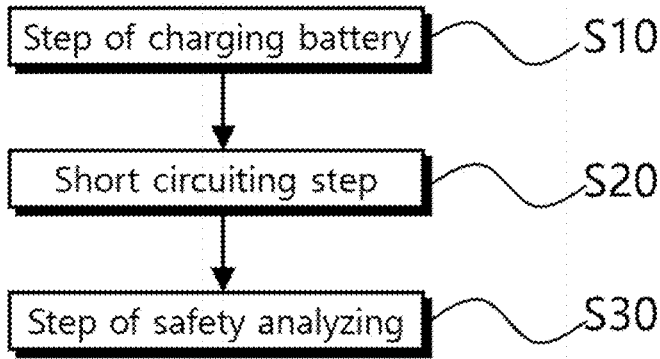
FIG. 4 is a block diagram illustrating a battery safety analysis method of the present disclosure.
Figure 5:
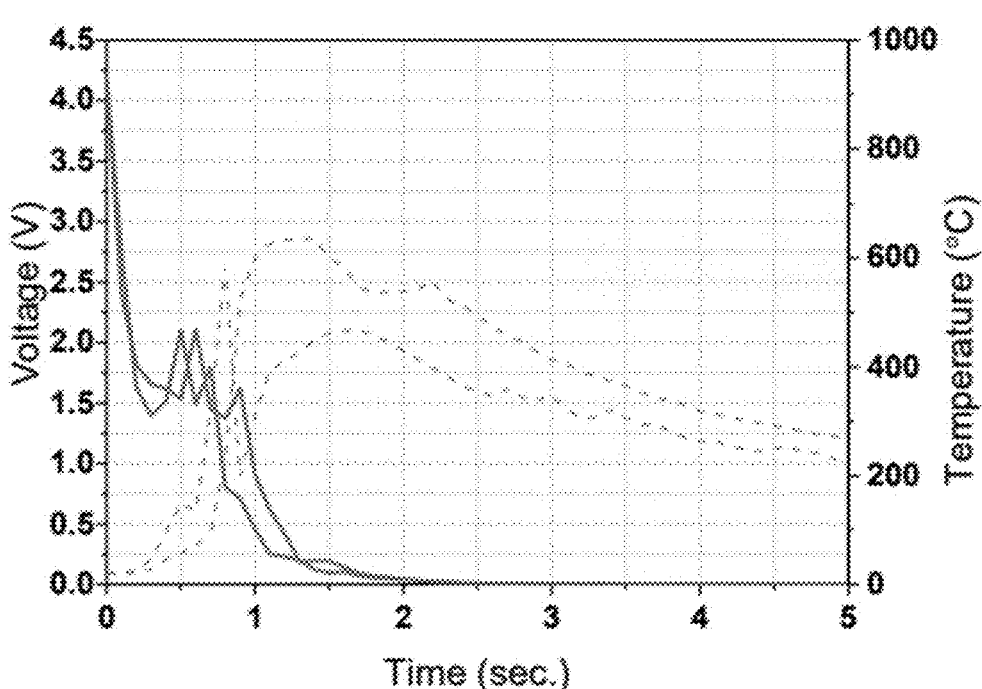
FIG. 5 is a graph illustrating measurement results of SOC and temperature according to an example embodiment.

FIG. 1 is a cross-sectional view illustrating the inside of a battery for short circuit inspection of the present disclosure. FIG. 2 is a plan view illustrating a state in which a positive electrode portion 100 and a perforated separator 310 are laminated. FIG. 3 is a block diagram illustrating a method of manufacturing the battery for short circuit inspection of the present disclosure. FIG. 4 is a block diagram illustrating a battery safety analysis method of the present disclosure. FIG. 5 is a graph illustrating measurement results of SOC and temperature according to an example embodiment.

Hereinafter, with reference to FIGS. 1 to 5, the battery for short circuit inspection, a manufacturing method thereof, and the battery safety analysis method of the present disclosure will be described in detail.

The battery for short circuit inspection of the present disclosure is provided in a state in which charging and discharging are normally carried out, and, after charging with a state of charge (SOC) value of a desired figure by a user, an internal short circuit state in which a negative electrode and a positive electrode are directly in contact inside the battery may be easily applied. Therefore, using the battery for short circuit inspection of the present disclosure, it may be possible to analyze safety of the battery while converting into a short circuit state immediately at a desired time during driving of the battery in various environments.

As shown in FIG. 1, the battery for short circuit inspection of the present disclosure may include:

a positive electrode portion 100 formed by applying a positive electrode active material 120 to a positive electrode current collector 110;

a negative electrode portion 200 formed by applying a negative electrode active material 220 to a negative electrode current collector 210;

a perforated separator 310 laminated between the positive electrode portion 100 and the negative electrode portion 200 and formed with a perforated hole 311;

an auxiliary separator 320 laminated between the positive electrode portion 100 and the negative electrode portion 200 and configured to cover the perforated hole 311; and a battery case configured to accommodate the positive electrode portion 100, the negative electrode portion 200, the perforated separator 310, and the auxiliary separator 320 therein, wherein, in the positive electrode portion 100, an active material-eliminated area 121, from which the positive electrode active material 120 is eliminated, may be formed in an area that faces the perforated hole 311 of the perforated separator 310.

The positive electrode current collector 110 or the negative electrode current collector 210 may be provided in the form of a foil-like thin sheet. Each of the positive electrode active material 120 and the negative electrode active material 220 is dried after being applied to the positive electrode current collector 110 or the negative electrode current collector in the form of a slurry so as to be formed as a layer with an appropriate thickness on one or both sides of the positive electrode current collector 110 and the negative electrode current collector 210.

The materials of the perforated separator 310 and the auxiliary separator 320 may include at least one or more of an ethylene monopolymer, propylene monopolymer, ethylene/butene copolymer, ethylene/hexene copolymer, and ethylene/methacrylate copolymer.

The positive electrode portion 100 and the negative electrode portion 200 may be provided in a plurality, respectively, and when the positive electrode portion 100 and the negative electrode portion 200 are provided in a plurality, the positive electrode portion 100 and the negative electrode portion 200 may be laminated by intersecting one another, and a separator may be provided individually between each of the positive electrode portion 100 and the negative electrode portion 200. In other words, when the positive electrode portion 100 and the negative electrode portion 200 are provided in a plurality, the separator may also be provided in a plurality, wherein only one or some of the plurality of separators may be provided as the perforated separator 310. For example, in a state in which the positive electrode portion 100, the negative electrode portion 200, and the separator are each provided in a plurality and laminated by intersecting one another, the active material-eliminated area 121 may be formed in the outermost positive electrode portion 100 of the plurality of positive electrode portions 100, and the separator that faces the active material-eliminated area 121 may be formed as the perforated separator 310. As a more specific example, five positive electrode portions 100 may be laminated within the six negative electrode portions 200 with the separator interposed therebetween, the active material-eliminated area 121 may be formed in one of the two positive electrode portions 100 adjacent to the outermost surface of the five positive electrode portions 100, and the perforated separator 310 and the auxiliary separator 320 may be positioned between the positive electrode portion where the active material-eliminated area 121 is formed and the outermost negative electrode portion 200 adjacent thereto. In other words, in the battery for short circuit inspection of the present disclosure, in the case that the plurality of positive electrode portions 100 and the plurality of negative electrode portions 200 are provided, the active material-eliminated area 121 may be formed only in one positive electrode portion 100 adjacent to the outermost surface, and may be laminated, from the outermost surface, in order of [negative electrode portion 200]-[perforated separator 310]-[auxiliary separator 320]-[positive electrode portion 100], or in order of [negative electrode portion 200]-[auxiliary separator 320]-[perforated separator 310]-[positive electrode portion 100]. Therefore, by an external pressurizer, the positive electrode portion 100 and the negative electrode portion 200 may be easily brought into contact with each other with a relatively small force.

As shown in FIG. 2, an area of the active material-eliminated area 121 may be greater than that of the perforated hole 311. Since the active material-eliminated area 121 is formed to be larger than the perforated hole 311, it is possible to stably apply a short circuit state in which the negative electrode active material and the positive electrode current collector come into contact, rather than the short circuit that the negative electrode active material and the positive electrode active material are in direct contact with each other.

One end of the auxiliary separator 320 may protrude outside the battery case. In other words, one end of the auxiliary separator 320 may be positioned outside the battery case, whereas the other end may cover the perforated hole 311 inside the battery case. The auxiliary separator 320 may be eliminated as one end is pulled when applying a short circuit state to the battery for short circuit inspection.

As shown in FIG. 3, a method of manufacturing the battery for short circuit inspection of the present disclosure may include:

a step of preparing an electrode S1 of preparing the positive electrode portion 100 in which the positive electrode active material 120 is applied to the positive electrode current collector and the negative electrode portion 200 in which the negative electrode active material 220 is applied to the negative electrode current collector 210;

a step of eliminating the positive electrode active material S2 of forming the active material-eliminated area 121 by eliminating the positive electrode active material 120 on a part of the positive electrode;

a step of laminating the perforated separator S3 of laminating, to the positive electrode portion 100, the perforated separator 310 in which the perforated hole 311 is formed in a position facing the active material-eliminated area 121;

a step of laminating the auxiliary separator S4 of laminating the auxiliary separator 320 to the perforated separator 310 to cover the perforated hole 311;

a step of laminating the negative electrode portion S5 of laminating the negative electrode portion 200 to the positive electrode portion 100 with the perforated separator 310 and the auxiliary separator 320 interposed therebetween; and a step of completing the battery S6 of completing the battery for short circuit inspection by sealing after accommodating the positive electrode portion 100, the negative electrode portion 200, the perforated separator 310, and the auxiliary separator 320 in the battery case.

In the step of preparing an electrode S1, the positive electrode portion 100 and the negative electrode portion 200 may be prepared by undergoing a mixing process in which the positive electrode active material 120 and the negative electrode active material 220 are kneaded in a slurry form, a coating process in which each slurry of the positive electrode active material 120 and the negative electrode active material 220 is applied to each of the positive electrode current collector 110 and the negative electrode current collector 210, a pressing process of pressurizing each of the coated electrode by applying heat, a slitting process of cutting the electrode to a standard, and a drying process of drying the electrode with hot air.

In the step of eliminating the positive electrode active material S2, the positive electrode active material 120 may be eliminated by washing with N-methyl-2-pyrrolidone (NMP). The size and shape of the active material-eliminated area 121 may be determined by conditions required in the battery safety analysis, and accordingly, the cleaning degree for the positive electrode active material 120 may also be determined in consideration thereof.

In the step of laminating the perforated separator S3, as shown in FIG. 2, the size of the perforated hole 311 may be formed to be in the active material-eliminated area 121.

In the step of laminating the auxiliary separator S4, the auxiliary separator 320 may be manufactured in a size sufficient to completely cover the perforated hole 311. In addition, since tension is generated as the other end is pulled upon elimination, it may be prepared in a standard that does not break upon elimination in consideration of tensile strength.

In the step of preparing an electrode S1 or the step of laminating the negative electrode portion S5, a positive electrode tab and a negative electrode tab are fused respectively to an active material-unapplied portion in each of the positive electrode portion 100 and the negative electrode portion 200, and each of the positive electrode tab and the negative electrode tab may be fused to each of a positive electrode lead and a negative electrode lead for electrical connection with an external device.

In the step of completing the battery S6, to make the positive electrode lead and the negative electrode lead protrude outside the battery case, the positive electrode portion 100 and the negative electrode portion 200 may be accommodated inside the battery case, and an electrolyte may be injected into the battery case so that the separator may be sufficiently impregnated. Then, the battery case may be sealed after the gas inside is removed.

As shown in FIG. 4, the battery safety analysis method of the present disclosure may include:

a step of charging the battery S10 of charging the battery for short circuit inspection;

a short circuiting step S20 of eliminating the auxiliary separator 320 and bringing the positive electrode portion 100 and the negative electrode portion 200 into contact through the perforated hole 311; and a step of safety analyzing S30 of measuring SOC or temperature of the battery for short circuit inspection to analyze safety.

In the short circuiting step S20, the battery for short circuit inspection may be pressed by the pressurizer, and the positive electrode portion 100 and the negative electrode portion 200 may be brought into direct contact through the perforated hole 311 by pressure applied by the pressurizer.

In the step of safety analyzing S30, SOC or temperature of the battery for short circuit inspection may be measured according to a time series. Based on the SOC value and temperature value as well as the time variation value of SOC and the time variation value of temperature, feature information on the safety of the battery may be derived.

In the step of safety analyzing S30, temperature measurement may be performed by attaching a temperature sensor directly to the battery for short circuit inspection or by measuring the internal temperature of a chamber after accommodating the battery for short circuit inspection in the chamber in which a closed space is formed.

Example

The positive electrode portions 100 and the negative electrode portions 200 were laminated in five layers, and the active material-eliminated area 121 was formed at the center of the uppermost positive electrode portion 100 to prepare two batteries for short circuit inspection.

After charging the two batteries for short circuit inspection by 0.33 C and 4.2V, in a state in which the auxiliary separator 320 was eliminated, the battery for short circuit inspection was pressurized by the pressurizer to apply a short circuit state.

FIG. 5 is a graph illustrating the SOC value and temperature value of two batteries for short circuit inspection according to a time series after the short circuit state is applied. Ignition was performed in the two batteries for short circuit inspection within 0.5~1.5 seconds. In FIG. 5, the solid line graph represents SOC, and the dotted line graph represents temperature.

Although the example embodiments according to the present disclosure have been described above, these are merely exemplary, and those skilled in the art will understand that various modifications and equivalent ranges of the example embodiments are possible therefrom. Accordingly, the scope for true technical protection of the present disclosure should be defined by the appended claims.

EXPLANATION OF SYMBOLS

100 . . . Positive electrode portion, 110 . . . Positive electrode current collector, 120 . . . Positive electrode active material, 121 . . . Active material-eliminated area, 200 . . . Negative electrode portion, 210 . . . Negative electrode current collector, 220 . . . Negative electrode active material, 310 . . . Perforated separator, 311 . . . Perforated hole, 320 . . . Auxiliary separator

INDUSTRIAL APPLICABILITY

A battery for short circuit inspection of the present disclosure may apply a short circuit state in a secondary battery arbitrarily in a desired situation and enable analysis of safety of the secondary battery by applying a short circuit state in the secondary battery under various conditions such as SOC, temperature, and shock.

In a battery safety analysis method of the present disclosure, it is possible to carry out safety analysis of the secondary battery by simulating a driving situation of a product to which the secondary battery is applied and applying a short circuit state.

The battery safety analysis method of the present disclosure may easily check whether the battery is safe.

The invention claimed is:

1. A battery for short circuit inspection, comprising:

a positive electrode including a positive electrode active material on a positive electrode current collector;

a negative electrode including a negative electrode active material on a negative electrode current collector;

a perforated separator between the positive electrode and the negative electrode and including a perforated hole;

an auxiliary separator between the positive electrode and the negative electrode and covering the perforated hole; and a battery case accommodating the positive electrode, the negative electrode, the perforated separator, and the auxiliary separator therein, wherein, the positive electrode includes an active material-eliminated area, from which the positive electrode active material is eliminated, formed in an area that faces the perforated hole of the perforated separator, wherein one end of the auxiliary separator protrudes outside the battery case, and wherein the auxiliary separator is configured to be eliminated by pulling the one end of the auxiliary separator to apply a short circuit state to the battery for short circuit inspection.

2. The battery of claim 1, wherein an area of the active material-eliminated area is greater than that of the perforated hole.

3. The battery of claim 1, wherein materials of the perforated separator and the auxiliary separator comprise at least one selected from the group consisting of an ethylene monopolymer, propylene monopolymer, ethylene/butene copolymer, ethylene/hexene copolymer, and ethylene/methacrylate copolymer.

4. A method for manufacturing the battery for short circuit inspection of claim 1, comprising:

a step of preparing the positive electrode in which the positive electrode active material is applied to the positive electrode current collector and the negative electrode in which the negative electrode active material is applied to the negative electrode current collector;

a step of eliminating the positive electrode active material on a part of the positive electrode to form the active material-eliminated area;

a step of laminating the perforated separator having the perforated hole formed in a position facing the active material-eliminated area, to the positive electrode;

a step of laminating the auxiliary separator to the perforated separator to cover the perforated hole;

a step of laminating the negative electrode to the positive electrode with the perforated separator and the auxiliary separator interposed therebetween; and a step of sealing the battery for short circuit inspection after accommodating the positive electrode, the negative electrode, the perforated separator, and the auxiliary separator in the battery case.

5. The battery for short circuit inspection manufacturing method of claim 4, wherein, in the step of eliminating positive electrode active material, the positive electrode active material is eliminated by washing with N-methyl-2-pyrrolidone (NMP).

6. A battery safety analysis method using the battery for short circuit inspection of claim 1, comprising:

a step of charging the battery for short circuit inspection;

a short circuiting step by eliminating the one end of the auxiliary separator and bringing the positive electrode and the negative electrode into contact through the perforated hole; and a step of safety analyzing by measuring a state of charge (SOC) or temperature of the battery for short circuit inspection to analyze safety.

7. The battery safety analysis method of claim 6, wherein, in the step of safety analyzing, the SOC or temperature of the battery for short circuit inspection is measured according to a time series.

* * * * *